United States Patent [19]

Shemwell et al.

[11] Patent Number: 4,879,532

[45] Date of Patent: Nov. 7, 1989

[54] METHOD AND APPARATUS FOR PHASE CONJUGATE OPTICAL MODULATION

[75] Inventors: David M. Shemwell, Dallas; Cyrus D. Cantrell, Richardson, both of Tex.

[73] Assignee: Board of Regents, The University of Texas System, Austin, Tex.

[21] Appl. No.: 606,678

[22] Filed: May 3, 1984

[51] Int. Cl.$^4$ .................... H01S 3/098; H01S 3/23
[52] U.S. Cl. ........................... 330/4.3; 350/3.66; 455/611; 307/425
[58] Field of Search ............... 332/7.51; 350/3.66, 350/3.67, 355; 372/21, 33; 455/611; 307/425

[56] References Cited

U.S. PATENT DOCUMENTS

| | | | |
|---|---|---|---|
| 4,187,000 | 2/1980 | Constant | 350/3.62 |
| 4,214,807 | 7/1980 | Gfeller et al. | 350/3.61 |
| 4,500,855 | 2/1985 | Feinberg | 332/7.51 |

OTHER PUBLICATIONS

Jain et al., "Degenerate 4 Wave Mixing . . . Semiconductors", Sep. 15, 1979, pp. 454–6, Appl. Phys. Lett., vol. 35, #6.

Krumin et al., "Steady-State . . . KnbO$_3$", 5/80, pp. 651–652, Sov J. Quant. Elec., vol. 10, #5.

Gunter, "Electric-Field . . . Bi$_{12}$GeO$_{20}$", 1/82, pp. 10–12, Opt. Lett., vol. 7, #1.

Gunter, "Transient Energy . . . Bi$_{12}$GeO$_{20}$", 3/15/82, pp. 83–88, Opt. Commun., vol. 41, #2.

Kukhtarev et al., "Transient Energy . . . Field", 12/77, pp. 338–343, Opt. Commun., vol. 23, #3.

Shemwell et al., "Effect of Static . . . in Silicon", 9/1/84, pp. 1309–13, J. Appl. Phys., vol. 56, #1.

*Primary Examiner*—Nelson Moskowitz
*Attorney, Agent, or Firm*—Arnold, White & Durkee

[57] ABSTRACT

A method and apparatus for phase conjugate optical modulation involves creating a phase hologram within a nonlinear medium by overlapping, within the nonlinear medium, a pair of laser beams, travelling along paths angled slightly with respect to one another. A third beam reads this hologram to produce the phase conjugate wave. An electric field is generated through the medium transversely to the overlapping laser beams within the medium. The intensity of the output conjugate beam is modulated according to the field strength of the applied electric field.

10 Claims, 1 Drawing Sheet

METHOD AND APPARATUS FOR PHASE CONJUGATE OPTICAL MODULATION

BACKGROUND OF THE INVENTION

1. Field of the Invention

This invention relates generally to modulating the output of laser optical systems, and particularly to a system for modulating the intensity of the output emission from a four-wave mixer used in real time holography.

2. Brief Description of the Background Art

The process of phase conjugation by degenerate four wave mixing or real time holography and its potential applications have been the subject of considerable interest over the past several years. These applications include the areas of adaptive optics and laser communications.

In any practical optical system, it is often desirable to modulate, or change, the intensity of the light being emitted by the system. This has been done in the past by adding an electro-optic or acousto-optic modulator to an optical system. However, it would be desirable to be able to modulate the output of an optical system, and particularly a phase conjugate optical system, without the introduction of other optical elements or modulators. This would reduce the complexity of the overall system as well as its size and expense.

SUMMARY OF THE INVENTION

It is a primary object of the present invention to provide a method and apparatus for modulating the output emission of a phase conjugate optical system within the four-wave mixer.

This and other objects of the present invention may be achieved by a method of modulating a phase conjugate laser beam that includes the step of creating a phase hologram within a nonlinear medium by causing a plurality of laser beams to overlap along a substantially coincident beam path through the nonlinear medium. An electric field is established and is directed substantially transversely to the beam path through the nonlinear medium.

In accordance with another embodiment of the present invention, an apparatus for modulating a phase conjugate laser beam includes a nonlinear medium. Means are provided for creating a phase hologram within the medium by causing a plurality of laser beams to overlap along a substantially coincident beam path through the nonlinear medium. In addition, means are provided for generating an electric field across the nonlinear medium in a direction substantially transverse to the beam path.

DETAILED DESCRIPTION OF THE PREFERRED EMBODIMENT

Figure 1:
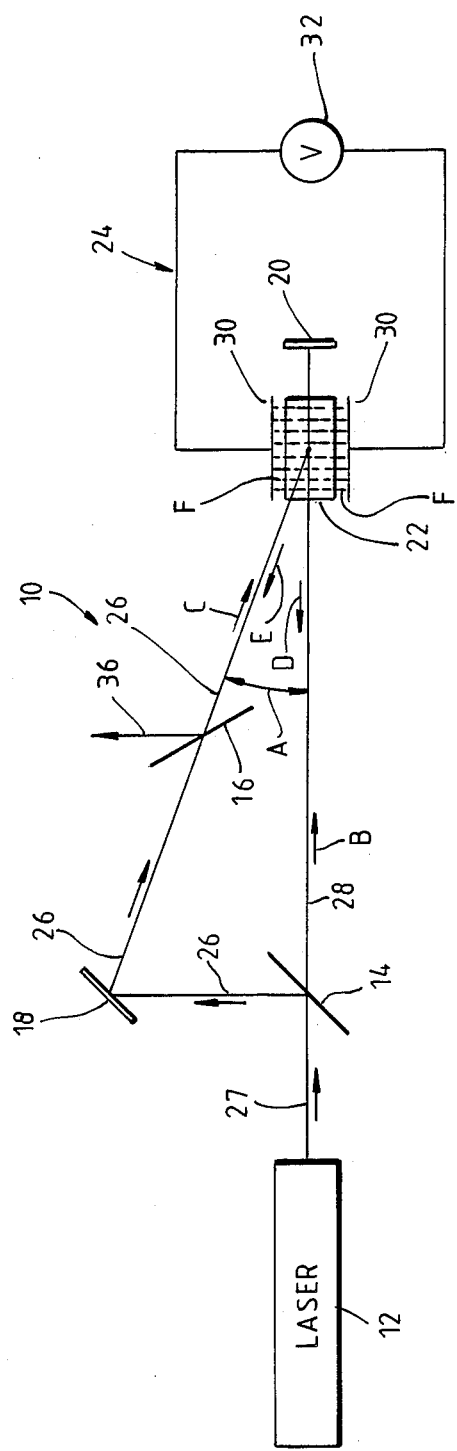
FIG. 1 is a schematic view showing one embodiment of the present invention.

Referring to the drawing wherein like reference characters are used for like parts, a phase conjugate optical modulator 10 includes a laser 12, a pair of beam splitters 14 and 16, a pair of mirrors 18 and 20, a nonlinear medium 22 and an electric field generator 24. The laser beam 27 generated by the laser 12 is split by the beam splitter 14 to travel along the two initially transverse paths 26 and 28. The beam travelling along the path 28 is directed straight through the nonlinear medium 22 to the mirror 20. The beam directed along the path 26 is reflected by the mirror 18 through the beam splitter 16 and the nonlinear medium 22.

Although the paths 26 and 28, shown in an exaggerated configuration for illustration purposes, appear to be substantially separated in the schematic figure, it should be understood that normally the separation between these two beam paths is very small. Specifically the angle A between the paths 26 and 28 is conventionally approximately 1° to 10°, and advantageously about 3°. As a result, the beams 26 and 28 travel along a substantially coincident beam path through the nonlinear medium 22. The production of a phase hologram within the nonlinear medium 22 may be in accordance with any conventional or known holographic techniques.

It is necessary to match the laser 12 and the nonlinear medium 22. Specifically, the particular laser 12 chosen must be capable of elevating the bound electrons in the particular nonlinear medium 22 selected, to the conduction band. The nonlinear medium 22 may be made of any semiconductor which is capable of producing a phase conjugate response via the elevation of electrons to the conduction band. The nonlinear medium 22 can be a transparent, homogenous semiconductor having a third order nonlinearity in susceptability. Suitable materials may include nonabsorbing, nonamplifying transparent materials exhibiting Kerr nonlinearities, such as cadmium sulfide and silicon. A suitable solid nonlinear medium 22 may conveniently be in the form of a block of material with side dimensions on the order of a few millimeters. In an embodiment using infrared laser light, the laser 12 could be a ND:YAG/glass laser, for example, and the nonlinear medium 22 could be silicon or any other semiconductor material with a band gap compatible with near infrared light. However, other emissive wavelengths known in the field of real time holography may be utilized as well.

The electric field generator 24 includes a pair of opposed plates 30, positioned on opposite sides of the nonlinear medium 22. The plates 30 are electrically connected to a voltage source 32. Advantageously, the voltage source 32 is capable of providing a varying electric potential to the plates 30 so that the electric field across the medium 22 may be varied in a desired fashion. The voltage source 32 may include a suitable, conventional control device to enable an amplitude variable voltage pattern or a constant potential to be created across the nonlinear medium 22.

The plates 30 are oriented so that the electric field "F" generated between them is substantially transverse to the beam path of the beams travelling along the incident paths 26 and 28 through the nonlinear medium 22. Since the angle A is small, the plates 30 may be situated so that the field is created generally transverse to the beam path 28. The plates 30 may be positioned in contact with the medium 22 or spaced from the medium 22. The plates 30 may, if desired, be glued to the medium 22. When the plates 30 are spaced from the medium 22, a dielectric may be interposed between the plates 30 and the medium 22.

Phase conjugation by degenerate four-wave mixing is the result of the overlap of the probe and pump beams progressing along the paths 26 and 28 respectively and incident upon the nonlinear medium 22 and a beam created by the reflection of the beam travelling along the path 28 by the mirror 20. The beams progressing along the paths 26 and 28, indicated by the arrows "B"

and "C" write a phase hologram in the medium 22 which is then read by the third or reflected beam, indicated by the arrows "D" and "E" from the mirror 20. The wave progressing counterflow along the path 26 in the direction of arrow "E", is reflected by the beam splitter 16 to form the modulated system output, indicated as 36. When the electric field generator 24 is inoperative, the strength of the output 36 is entirely dependent on the nonlinear medium 22 and the laser 12 which is utilized.

When an electric field is generated by the generator 24, the field moves free carrier charges in the nonlinear medium 22, washing out the phase hologram. The amount of movement depends on the strength of the field and therefore the efficiency depends on the strength of the field. The applied electric field may be used to speed the erasure of the hologram and thus to decrease the time needed before the medium 22 may be used again. Alternatively, the applied field may be modulated to modify the efficiency of the phase conjugate process and thereby modify the strength of the output beam 36. Thus, information may be impressed on the output beam 36 by varying the source 32 potential.

The dominant mechanism in a semiconductor for the phase conjugation process is generally the formation of free charge carriers by the promotion of electrons to the conduction band. The sinusoidal interference pattern of the laser energy within the nonlinear medium 22 produces a sinusoidal population of electrons and holes, which in turn produce a thick phase electron-hole free carrier grating. Once the carriers are generated within the nonlinear medium 22, they are mobile and with a relatively modest direct current electric field, a relatively large dispersal of the electron-hole free carrier grating may be produced. Specifically with a silicon nonlinear medium 22, an electric field with a field strength of about 1,000 volts per centimeter or higher is effective. In general, electric fields with field strengths in the range of approximately 1000 to approximately 3000 volts per centimeter are suitable.

The application of the transverse electric field results in two independent population gratings of electron-hole pairs, which move in opposite directions independent of their normal electrostatic attraction. Since the source of the electron-hole pairs, the interference pattern of the laser light, is fixed, the modulation depth of the grating is reduced as it moves. This reduction of modulation depth is assisted by mutual repulsion which tends to disperse unbalanced charge distributions. Thus, substantial modification of the population by the field may be accomplished within a few nanoseconds. This causes a reduction in intensity of the phase conjugate wave.

The field induced reduction of the efficiency of the response of the system provides a technique for modulating the phase conjugate beam. The modulated output beam 36 may be constantly modulated to produce a desired output intensity or it may be variably modulated to carry desired information. Since the modulation is carried out integrally within the optical system, no added components are necessary other than the electric field generator 24 itself.

While the present invention has been described with respect to a single preferred embodiment, those skilled in the art will appreciate a number of variations, and it is intended within the appended claims to cover all such variations that come within the true spirit and scope of the appended claims.

What is claimed is:

1. A method of modulating a phase conjugate laser beam comprising the steps of:
    creating a phase hologram within a nonlinear semiconductor medium by causing a plurality of laser beams to overlap along a substantially coincident beam path through said nonlinear semiconductor medium; and
    dispersing the phase hologram by establishing an electric field directed substantially transversely to said beam path through said nonlinear semiconductor medium to modulate the intensity of the diffracted light.

2. The method of claim 1 including the step of modulating the electric field intensity.

3. The method of claim 1 wherein said field establishing step involves the step of establishing a field of sufficient field strength to disperse the electron-hole free carrier grating resulting from the phase hologram.

4. The method of claim 1 wherein said field establishing step includes the step of establishing an electric field with a field strength of from approximately 1,000 to approximately 3000 volts per centimeter.

5. An apparatus for modulating a phase conjugate laser beam comprising:
    a nonlinear semiconductor medium;
    means for creating a phase hologram within said medium by causing a plurality of laser beams to overlap along a substantially coincident laser beam path through said nonlinear semiconductor medium; and
    means for dispersing the phase hologram by generating an electric field across said nonlinear semiconductor medium in a direction substantially transverse to said beam path to modulate the intensity of the diffracted light.

6. The apparatus of claim 5 including means for varying the electric field intensity.

7. The apparatus of claim 5 wherein said nonlinear medium is silicon and said means for creating a hologram includes a laser operating in the infrared range.

8. The apparatus of claim 5 wherein said phase hologram creating means includes a pair of laser beams directed through said nonliner medium at an angle to one another and a mirror arranged to reflect one of said beams back through said nonlinear medium.

9. The apparatus of claim 8 wherein the angle between said beams is approximately 3°.

10. The apparatus of claim 8 wherein one of said beams is directed axially through said nonlinear medium and the other of said beams is directed through said nonlinear medium at a slight angle to said one beam to produce a transient hologram which is read by a third beam to produce a conjugate wave that is reflected from the nonlinear medium, said apparatus including a beam splitter located along the path of said other beam so as to deflect the conjugate wave produced in the nonlinear medium from the path of said other beam.

* * * * *